Figure 5:
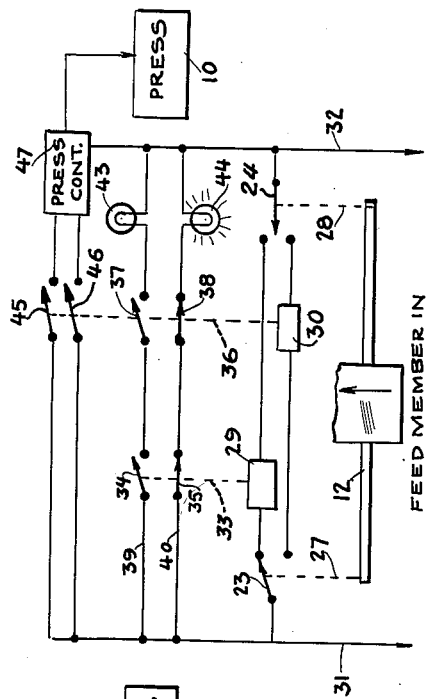

April 17, 1962
E. W. ONULAK
3,030,616
CIRCUIT FAILURE INDICATOR
Filed Jan. 15, 1959
2 Sheets-Sheet 1
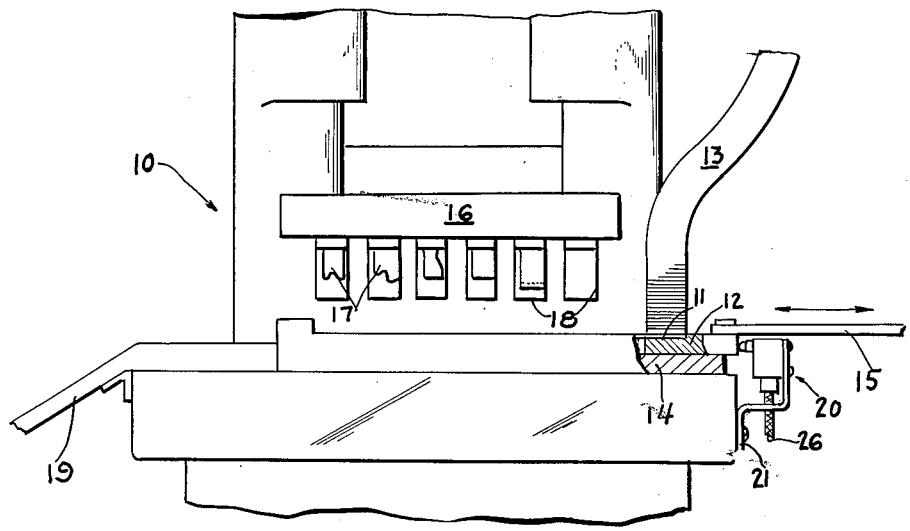
Fig. 1
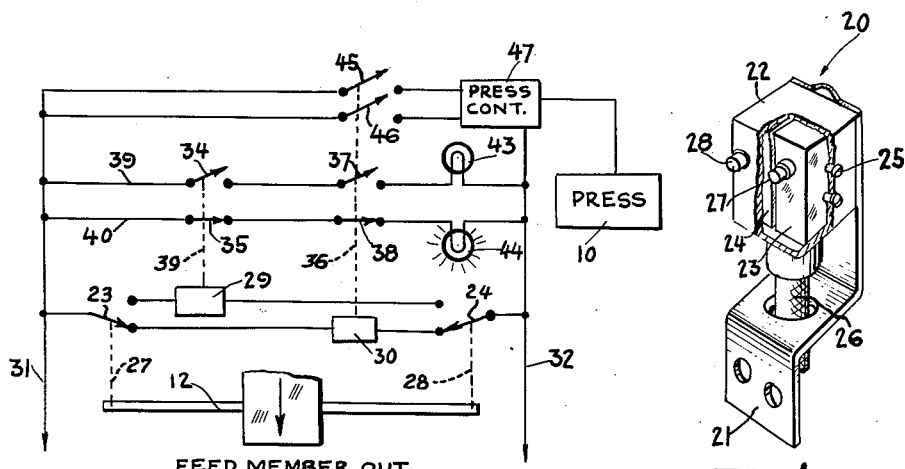
Fig. 7
Fig. 2
INVENTOR
EUGENE W. ONULAK
BY
Pollard, Johnston, Smythe & Robertson
ATTORNEYS

INVENTOR
EUGENE W. ONULAK

United States Patent Office 3,030,616
Patented Apr. 17, 1962

3,030,616
CIRCUIT FAILURE INDICATOR
Eugene W. Onulak, Trumbull, Conn., assignor to The Locke Steel Chain Co., Huntington, Ind., a corporation of Connecticut
Filed Jan. 15, 1959, Ser. No. 787,077
10 Claims. (Cl. 340—267)

The present invention relates to an arrangement for indicating circuit failure such as in presses wherein the feed member delivering an advancing work piece is electrically interlocked with the press head. The invention also can be used for other purposes such as where the indicator must show a safe condition as in closing of aircraft apertures.

As an example, in previously available presses, switches have been used to indicate that the feed member is withdrawn from the press before the head advances the dies toward the work blank. Such switch devices may also be used to control the press head actuating equipment so that the dies may not advance toward the work piece unless the feed member is in the withdrawn position. Obviously, if the head and dies descended while the feed member is still advanced, the machine would be seriously damaged.

It is apparent that safe operation of the machine is dependent upon the switch device sensing the advanced and withdrawn positions of the feed member. Therefore, safeguards are needed to provide for the condition wherein the switch device itself may fail. The present invention solves this problem by providing an additional switch to the interlocking switch circuitry so as to monitor and safeguard the operation of the interlocking switch for all foreseeable failure conditions.

A similar problem exists for other types of indicators such as in aircraft where it is necessary to indicate that doors, landing gear, etc. are in a particular position during various phases of flight.

One of the primary objects of the present invention is to provide apparatus to indicate the failure of an electrical interlocking circuit.

Another object of the invention is to provide apparatus for indicating the failure of an electrical sensing circuit.

A still further object of the invention is to provide an additional switch and relay devices to monitor the operation of an interlocking switch for the feed member of a power press and to energize an alarm upon failure of the interlocking or monitoring circuits.

The invention is particularly adapted for use in indicating a failure in a switching device used to detect the position of a machine member. It includes a pair of branches and a pair of switches actuated together according to the position of the machine or similar element. The switches each have normally open and normally closed contacts with the contacts of each switch connected to different branches of the pair. The contacts in each branch are serially connected to a power source and an alarm device. In the case of a failure of either switch or their contacts upon operating the switches, the alarm will be actuated.

In another aspect, the invention relates to an interlocking circuit with failure indication in which a pair of switches are actuated in response to the position of a machine member. The pair of switches energize one of a pair of relays for each state of the machine members. The contacts of each relay are connected to an alarm device so that failure of either switch relay or of the contacts will cause the alarm to be energized.

These and other objects, features and advantages of the invention will become apparent from the following detailed description and drawings which are merely exemplary.

Figure 6:
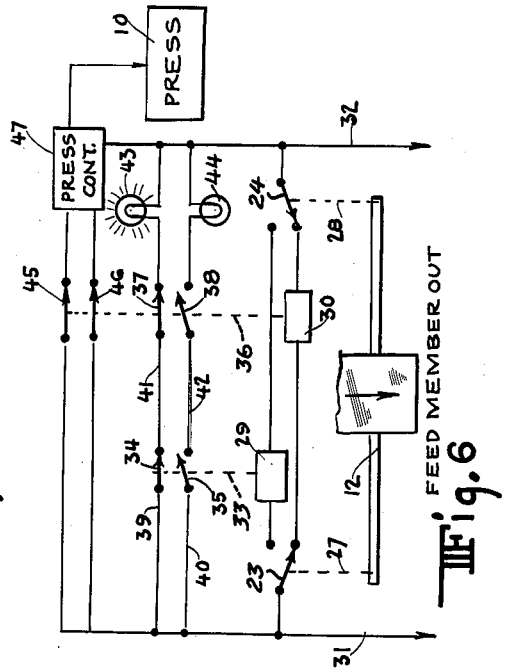
Figure 3:
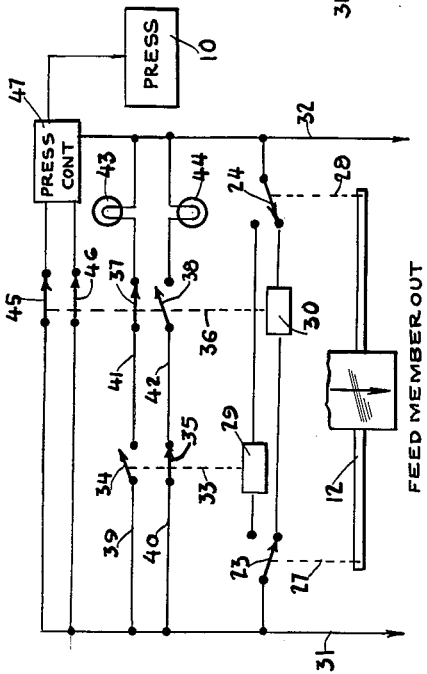
Figure 4:
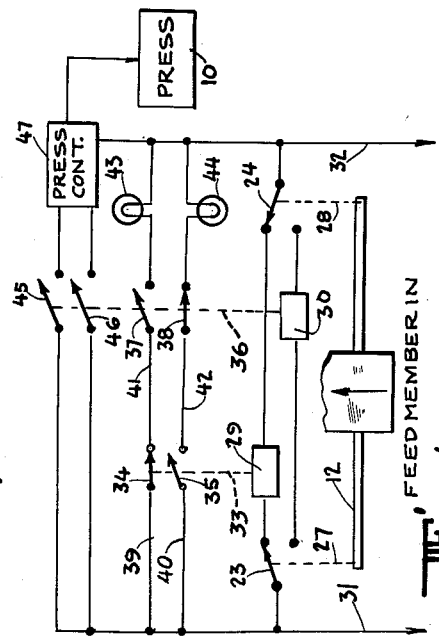

In the drawings:
FIG. 1 is a fragmentary elevational view of the press with the switch device installed.
FIG. 2 is a perspective view of the switch device.
FIG. 3 is a schematic diagram of the press circuit in normal operation with the feed member out.
FIG. 4 is a schematic diagram of the press circuit in normal condition with the feed member in.
FIG. 5 is a schematic diagram of the press circuit showing a failed switch with the feed member in.
FIG. 6 is a schematic diagram of the press circuit with a failed relay contact and with the feed member out.
FIG. 7 is a schematic diagram of the press circuit with a failed relay and the feed member out.

The invention will be described first in conjunction with a press wherein FIG. 1 shows a press 10 with which the circuit failure indicator may be used. The work blanks which are to be formed by press 10 are delivered to the first station 11 of reciprocating feed member 12 by magazine 13. Feed member 12 is supported within frame member 14 and is reciprocated by means of operating rod 15 driven by a motor (not shown). Feed member 12 advances the blanks away from the magazine and across the press following each stroke of the vertically reciprocating head 16 which carries the dies 17. Vertical holding rods 18 hold the blank during the forming operation of each die 17. After being formed by all of the dies 17, the finished piece is advanced by feed member 12 so that it passed down chute 19 and away from the press.

With the step-by-step feed action of feed member 12, it is necessary to prevent operation of the head 16 until the feed member 12 has advanced the blanks in a direction away from magazine 13 and then been withdrawn from the path of travel of the dies. To indicate that feed member 12 is fully withdrawn after the feeding cycle, a switch device 20 is attached to the press at a location such that withdrawn feed member 12 will place the switch device 20 in a particular state. As shown in FIG. 2, switch device 20 may include an attaching bracket 21, a housing 22, and button switches 23 and 24, mounted with housing 22 and secured by screws 25. Electrical connections to switches 23 and 24 may be made through cable 26. Buttons 27 and 28 of switches 23 and 24, respectively, extend through openings in housing 22. As shown in FIG. 1, when the feed member 12 is withdrawn so as to permit the dies 17 to descend, feed member 12 will contact buttons 27 and 28 and actuate their respective switches. Switches 23 and 24 may be of the single pole double-throw type with the buttons spring-loaded in the outward position.

As shown in FIG. 3, switches 23 and 24 are actuated by the outward motion of the feed member 12 forcing in switch buttons 27 and 28. Switches 23 and 24 operate so as to complete continuity alternately through relays 29 and 30. As shown in FIG. 3, relay 30 is energized by the circuit from a power source (not shown) through line 31, switches 23 and 24, and line 32. Relay 29 controls the position, as indicated by dash line 33, of the normally open contact 34 and the normally closed contact 35. Relay 30 controls the position, as represented by the dash line 36, of normally open contact 37 and normally closed contact 38. Contacts 34 and 35 are connected by means of lines 39 and 40, respectively, to line 31 leading to the power source. Contact 34 is connected to contact 37 by means of line 41 and contact 35 is connected to contact 38 by means of line 42. Alarm lamp 43 is connected between contact 37 and line 32 while alarm lamp 44 is connected between contact 38 and line 32.

Relay 30 is provided with additional normally open contacts 45 and 46 which connect line 31 from the power source to the press control 47. Press control 47 is connected to the press 10 so as to permit the descent of the press head 16 only when the feed member 12 is withdrawn.

As shown in FIG. 3, switches 23 and 24 are positioned so as to energize relay 30 and thus closing contact 37 while opening contact 38. With the normally open contact 34 and the normally closed contact 35, it is evident that the circuits to the alarm lamps 43 and 44 are both maintained open. Thus, the lamps indicate that the press circuit is operating in a normal fashion. Contacts 45 and 46 of the energized relay 30 are closed thereby operating the press control 47 so that the head 16 of press 10 may descend upon the work blank.

In FIG. 4, the press circuit is shown for the condition in which the feed member has advanced in toward the press so as to deliver or reposition the work piece upon the dies within the press. In this state, switches 23 and 24 are positioned so as to energize relay 29. Relay 29 causes contact 34 to close and contact 35 to open. Contact 37 assumes its normally open state and contact 38 assumes its normally closed state. In this manner, the circuits to the alarm lamps 43 and 44 are maintained open so that no alarm is given. Contacts 45 and 46 of relay 30 assume their open position so that press control 47 prevents the descent of head 16 of press 10.

In FIG. 5, the feed member has advanced inwardly so that button 27 has positioned switch 23 into contact with relay 29. Switch 24 is shown in a failed condition so that it does not connect to relay 29. In this case, both relays 29 and 30 remain deenergized so that the switch contacts of each remain in their normal state. Because of this, contacts 35 and 38 remain closed thereby connecting alarm lamp 44 to the power source so that it is illuminated. Contacts 45 and 46 remain in their normally open condition so that press control 47 prevents the descent of the head 16 of press 10. In this manner, the failure of switch 24 results in a failure indication while at the same time precluding the descent of the press head upon the advanced feed member within the press.

In FIG. 6, switches 23 and 24 are shown connected to relay 30. Contacts 34 and 35 are shown in a failed condition wherein they remain connected to lines 41 and 42, respectively. With contact 34 in the closed position, a circuit is completed through line 41 and closed contact 37 so as to energize alarm lamp 43. At the same time, contacts 45 and 46 are held in their closed position energizing press control 47 so as to permit the descent of head 16 of press 10. FIG. 6 demonstrates that the failure of contacts 34 and 35 is indicated by the energized signal lamp 43 while at the same time the closed contacts 45 and 46 permit operation of the press head 16. Thus operation of head 16 is permissible since in this state, the slide has been withdrawn from the press as sensed by switches 23 and 24. With the failure of the contacts 34 and 35 of relay 29 the press head remains interlocked with respect to the feed member while at the same time, the press operator is made aware of the failure by the alarm lamp before press operation is interrupted.

In FIG. 7, a failure is shown for relay 30 so that contacts 37 and 38 remain in their normal state. Closed contact 35 and closed contact 38 thereby complete a circuit to alarm lamp 44 so that it is illuminated. The failure of relay 30 results in contacts 45 and 46 remaining in their open condition so that press control 47 precludes the descent of the head 16 of press 10.

FIGS. 5 to 7, inclusive, represent a number of possible failure conditions and the means by which the alarm lamp is energized. Other combinations of failures in the push button switches, the relays, or the relay contacts will similarly light the alarm lamp.

In another embodiment of the invention, relay 29 with its contacts 34, 35 and relay 30 with its contacts 37, 38, 45 and 46 may be each replaced by push button switches having the same contact configuration as the respective relays. Then, switches 23 and 24 operated by switch buttons 27 and 28 would no longer be needed. The push button switches having contacts like relays 29 and 30 would then be directly operated by the feed member 12.

It should be evident that the system described can be used for other purposes where two parts are moved relative to each other such as, for example, the door of an airplane. If a conventional single similar circuit is used, failure thereof may cause considerable delay in detecting.

It should be apparent that details of construction and form can be varied without departing from the spirit of the invention except as defined in the appended claims.

What is claimed is:

1. A failure indicator circuit comprising a power source, circuit failure indicating means, first relay means having contact means adapted to be connected to an external circuit and normally open and normally closed contact means, second relay means having normally open and normally closed contact means, each of the normally open and normally closed contact means of said first relay means being connected to said power source, said indicating means, and to different contact means of said second relay means, a plurality of switch means, connected to said power source and operable togther, alternately energizing said relay means, so that failure of said first relay means, said second relay means, or any of said plurality of switch means, to be operated together with one another will result in said failure indicating means being actuated.

2. A failure indicating control circuit comprising indicating means, first relay means having contact means adapted to be connected to an external circuit, second relay means, both of said relay means having normally open and normally closed contact means, said normally open and normally closed contact means of said first relay means being serially connected to different contact means of said second relay means, and to said indicating means, a plurality of switch means operable to control both of said relay means, said switch means together being alternately connected to said first relay means and said second relay means, so that failure of said first relay means, said second relay means, or one of said plurality of switch means will result in said indicator means being actuated.

3. A failure indicating circuit for interlocking the head member and the feed member of a press, including a power source, indicator means, a pair of switch means actuated in response to the movement of said feed member, one of said switch means having contacts interlocking said head member and said feed member, each of said switch means having normally open and normally closed contacts, each of said normally open and normally closed contacts of one of said switch means being serially connected to said power source, said indicator means, and to a different one of said normally open and normally closed contacts of the other of said switch means, so that a failure of either of said switch means will result in the actuation of said indicator means.

4. A failure indicating circuit for interlocking the head member and feed member of a press, including indicating means, first relay means having means for interlocking said head member and said feed member, second relay means, said first relay means and said second relay means having normally open and normally closed contact means, each of said normally open and normally closed contact means of said first relay means being serially connected to a different one of said normally open and normally closed contact means of said second relay means and said indicating means, a plurality of switch means each having contact means connected to said relay means, said plurality of switch means being operable by said feed member and being alternately connected to said first relay means or said second relay means, so that failure of either of said relay means or one of said plurality of switch means results in the actuation of said indicator means.

5. A failure indicating circuit for interlocking the head member and the feed member of a press, including a power source, indicator means, a pair of switch means actuatable in response to the movement of said feed member, one of said switch means having contacts interlocking said head member and said feed member, each of said switch means having normally open and normally closed contacts, said normally open contacts of each switch means being serially connected to said power source, to said indicator means, and to said normally closed contacts of the other of said switch means, so that a failure of said switch means will result in said indicator means being actuated.

6. A failure indicating circuit for interlocking the head member and feed member of a press, comprising indicating means, first relay means having contact means for interlocking said head member and said feed member, second relay means, said first relay means and said second relay means each having normally open and normally closed contact means, said normally open and said normally closed contact means of said first relay means being serially connected to said normally closed and said normally open contact means, respectively, of said second relay means and said indicating means, a plurality of switch means each having contact means connected to said relay means, said plurality of switch means being operable by said feed member to control said first relay, said switch means being alternately connected to said first relay means and said second relay means, so that failure of either of said relay means or one of said plurality of switch means will result in the actuation of said indicating means.

7. A failure indicating circuit including a pair of branches, a pair of switch means each having a normally open and a normally closed switch element, said switch elements of each of said pair of switch means being serially connected in circuit with different branches of said pair of branches, the condition of said switch elements of each of said branches having a predetermined relationship with one another, circuit failure indicating means serially connected in circuit with said branches, said indicating means being actuated in response to the loss of said predetermined relationship, external circuit switch means operable in response to the operation of at least one of said pair of switch means, and means for simultaneously operating said pair of switch means, the operation of said pair of switch means changing their relative open and closed condition in said predetermined relationship so that, if said switch elements of said pair of switch means are not in said predetermined relationship, said indicating means will be actuated.

8. A failure indicating circuit including a pair of branches, a pair of relay means each having normally open and normally closed switch elements, said switch elements of each of said pair of relay means being serially connected in circuit with different branches of said pair of branches, the condition of said switch elements of each of said branches having a predetermined relationship with one another, failure indicating means serially connected in circuit with said branches, said indicating means being actuated in response to the loss of said predetermined relationship, additional switch elements adapted to be connected to an external circuit, said additional switch elements being operated in response to the operation of at least one of said relay means, a plurality of switch means alternately connected in series to one of said pair of relay means, and means for simultaneously operating said plurality of switch means so that, if said switch elements of said pair of relay means are not in said predetermined relationship, said indicating means will be actuated.

9. A failure indicating circuit including circuit failure indicating means, first switch means having external circuit contact means and normally open and normally closed contact means, and second switch means having normally open and normally closed contact means, means for simultaneously operating said first and second switch means, circuit failure indicating means, each of said normally open and normally closed contact means of said first switch means being serially connected to said indicating means and to a different contact means of said second switch means to form a normal indicating circuit condition, said circuit failure indicating means being responsive to the loss of said normal indicating circuit condition, so that a failure of said first switch means or said second switch means to be operated with one another by said operating means results in a change from the normal indicating circuit condition and actuation of said indicating means.

10. A failure indicating circuit including a power source, circuit failure indicating means, first switch means having contact means adapted to be connected to an external circuit and normally open and normally closed contact means, and second switch means having normally open and normally closed contact means, means for simultaneously operating said first and second switch means, each of said normally open and normally closed contact means of said first switch means being serially connected to said power source, to said indicating means, and a different contact means of said second switch means to form a normal indicating circuit condition, said circuit failure indicating means being responsive to the loss of said normal indicating circuit condition, so that failure of said first switch means or said second switch means to be opearted with one another by said operating means will result in a change from the normal indicating circuit condition and actuation of said circuit failure indicating means.

References Cited in the file of this patent

UNITED STATES PATENTS

| | | |
|---|---|---|
| 2,248,351 | Hughes et al. | July 8, 1941 |
| 2,701,872 | Marmorstone | Feb. 8, 1955 |
| 2,794,523 | Cortelli et al. | June 4, 1957 |
| 2,908,369 | Frey et al. | Oct. 13, 1959 |